United States Patent [19]

Will

[11] Patent Number: 5,119,433
[45] Date of Patent: Jun. 2, 1992

[54] METHOD AND SYSTEM FOR LOCATING THE AMOUNT FIELD ON A DOCUMENT

[75] Inventor: Terry A. Will, Charlotte, N.C.

[73] Assignee: International Business Machines Corporation, Armonk, N.Y.

[21] Appl. No.: 491,897

[22] Filed: Mar. 12, 1990

[51] Int. Cl.⁵ .............................................. G06K 9/00
[52] U.S. Cl. .................................... 382/7; 382/9; 382/48; 382/61
[58] Field of Search ...................... 382/7, 18, 9, 61, 48

[56] References Cited

U.S. PATENT DOCUMENTS

| | | | |
|---|---|---|---|
| 4,685,141 | 8/1987 | Hogue et al. | 382/7 |
| 4,736,441 | 4/1988 | Hirose et al. | 382/9 |
| 4,850,025 | 7/1989 | Abe | 382/9 |
| 4,903,311 | 2/1990 | Nakamura | 382/18 |

Primary Examiner—Leo H. Boudreau
Attorney, Agent, or Firm—Kenneth A. Seamna

[57] ABSTRACT

A system for locating and identifying the amount of field on a check or other financial document including the steps of identifying the type of characters within each rectangular block as either machine print, hand print, decimal point, or vertical bar, and then using that identification of type to determine which block is to be identified as the amount field.

6 Claims, 3 Drawing Sheets

Fig. 2.

ABC CORPORATION
1 INDUSTRIAL DRIVE
CHARLOTTE, NC 12345

DATE
02/23/90

PAY TO THE
ORDER OF   XYZ  CORPORATION

ACCOUNT NO.
12345678

AMOUNT
$··423.40

John Q. Treasurer 012345  9999-1111  0123-45678-9012

| LINE | # of BLACKS |
|------|-------------|
| 101  | 2           |
| 102  | 1           |
| 103  | 407         |
| 104  | 30          |
| 105  | 120         |
| 106  | 110         |
| 107  | 30          |
| 108  | 407         |
| 109  | 30          |
| 110  | 130         |
| 111  | 120         |
| 112  | 30          |
| 113  | 407         |
| 114  | 2           |
| 115  | 1           |
| 116  | 2           |
| 117  | 169         |
| 118  | 203         |
| 119  | 12          |
| 120  | 1           |

Fig. 5.

ACCOUNT NO.
12345678

AMOUNT
$··423.40

ACCOUNT NO.
12345678

AMOUNT
$··423.40

CHARACTER STRING 1: |ACCOUNT NO.|
CHARACTER STRING 2: | 12345678 |
CHARACTER STRING 3: | AMOUNT |
CHARACTER STRING 4: | $**423.40 |

Fig. 6.

CLASSIFIED STRING 1: |MMMMMMMM.|
CLASSIFIED STRING 2: |MMMMMMM|
CLASSIFIED STRING 3: |MMMMM|
CLASSIFIED STRING 4: |MMMMM.MM|

Fig. 7.

| $**423.40 |

Fig. 8.

METHOD AND SYSTEM FOR LOCATING THE AMOUNT FIELD ON A DOCUMENT

CROSS REFERENCE TO RELATED PATENTS

The present invention relates to the following IBM patents:

1. "Document Processor Including A Method and Apparatus For Identifying and Correcting Errors" Ser. No. 07/491,896 filed by Dinan et al. Mar. 12, 1990, the specification and drawings of which are hereby specifically incorporated herein by reference.

2. "Image Balancing System and Method" Ser. No. 07/492,461 filed by Lyke et al. Mar. 12, 1990, the specification and drawings of which are hereby specifically incorporated herein by reference.

BACKGROUND OF THE INVENTION

1. Field of the Invention

The present invention relates to a method and system for processing documents. More specifically, the present invention is specifically related to the process for locating a particular field on a document, such as the amount field which appears in a location which varies from one type of check to the next, but which is identifiable by predetermined algorithms.

2. Background Art

Various document processors (also referred to as "reader/sorters" or "check readers" by some) have been marketed by various manufacturers. Some of these document processors include apparatus and methods for lifting either the entire image of the document as it passes or a selected portion of the document. For example, IBM marketed a machine known as the IBM Model 3895 in the 1970's which processed documents including apparatus and methods to locate and store an image window including the field known as the courtesy amount or the amount field.

Other systems have been proposed which use an image of the document or portions of it in an attempt to either recognize the amount or present it on a screen so that an operator can key enter into memory the amount on the document. Examples of such systems include U.S. Pat. No. 4,264,808 to Owens et al.; U.S. Pat. No. 4,205,780 to Burns et al.; and U.S. Pat. 4,813,077 to Woods et al.

In each of these systems, it is important that the amount field be located accurately. In some systems such as described in the Woods et al. patent, the amount field must be located in a predetermined location and within predetermined boxes in order that the system can accurately locate both the amount fields and the individual characters within the amount field. Other systems have been proposed which also constrain or require that the amount field be placed in a particular orientation. However, a bank which is processing all the checks that its customers choose to deposit cannot require that all checks be prepared in a predetermined or fixed format. That is, there are a plurality of different check formats, and the amount field is not located in a consistent position from one format to the next. Some of these are dictated by the data processing equipment which is used, others are dictated by the blank form format, for instance in a system where the payee and the amount are on a single carbonized line.

Another system is shown in U.S. Pat. No. 4,588,211 to E. B. Greene. This system identifies the location of the amount field (or another field of interest) with a fluorescent or phosphorescent ink, which allows only a field of interest to be read.

U. S. Pat. No. 4,493,108 to Fryer et al. describes a video image field cut technique for dynamically segmenting an image, extracting fields of interest.

Despite where the amount field is positioned on the check it is desirable to locate the amount field accurately and to place a small window around that amount field to allow the amount field and only the amount field to be displayed to an operator for verification or keying. This minimizes the amount of information which is forwarded and yet allows the entire amount field to be processed.

Accordingly, it is desirable that the amount field (and only the amount field) be accurately located and partitioned into a separate window for further processing. The prior art does not specifically locate this amount field and allow its processing across the plurality of types of documents which may be presented to a financial institution.

SUMMARY OF THE INVENTION

The present invention overcomes the limitations and disadvantages of the prior art by providing a system in which the amount field is identified as such and a window around it is provided to allow the amount field itself to be presented to an operator or a recognition system for further processing.

The present invention comprises a stored image scan of the entire front of a document in which each horizontal slice of the image is analyzed for the number of black pels, locating the horizontal bands in which information appears, discarding bands which are blank or have only "noise", and bands too narrow to include in a field, in the preferred embodiment. Next, each horizontal band in which significant information exists is analyzed using vertical slices to locate windows in which information appears. Next, each window is processed in order to remove the horizontal lines which may delineate the window, leaving the vertical lines. Following this, within each window, the individual elements are identified as either being a hand print character, a machine print character, a vertical bar or a decimal point. Based upon this identification then, a signature for each block is provided, and then the block which has the signature appropriate for the amount field is selected as the recognized amount field.

The present invention has the advantageous effect of locating an amount field and identifying an amount field (as distinguished from another type of field, such as a date field, which has somewhat similar characteristics).

The present invention also has the advantageous effect that the amount field alone may be provided in a window for recognition or for operator keying. This allows a minimum amount of information, the smallest packet of information, to be forwarded for processing, reducing demands on the system.

Other objects and advantages of the present invention will be apparent to those skilled in the art in view of the following description of the invention, the appended claims, and the accompanying drawings.

BRIEF DESCRIPTION OF THE DRAWINGS

FIG. 2 shows a sample check used in illustrating the present invention.

FIG. 3 illustrates the results from the scans across horizontal lines in FIG. 1.

FIG. 4 illustrates a selected horizontal band from the check of FIG. 2 as processed using the results of FIG. 3.

FIG. 5 illustrates the two windows selected from the horizontal band of FIG. 4 after processing.

FIG. 6 illustrates character strings which are processed from the windows of FIG. 5.

FIG. 7 illustrates classified strings processed from the character strings of FIG. 6.

FIG. 8 illustrates the selected amount field.

DETAILED DESCRIPTION OF PREFERRED EMBODIMENT

Figure 1:
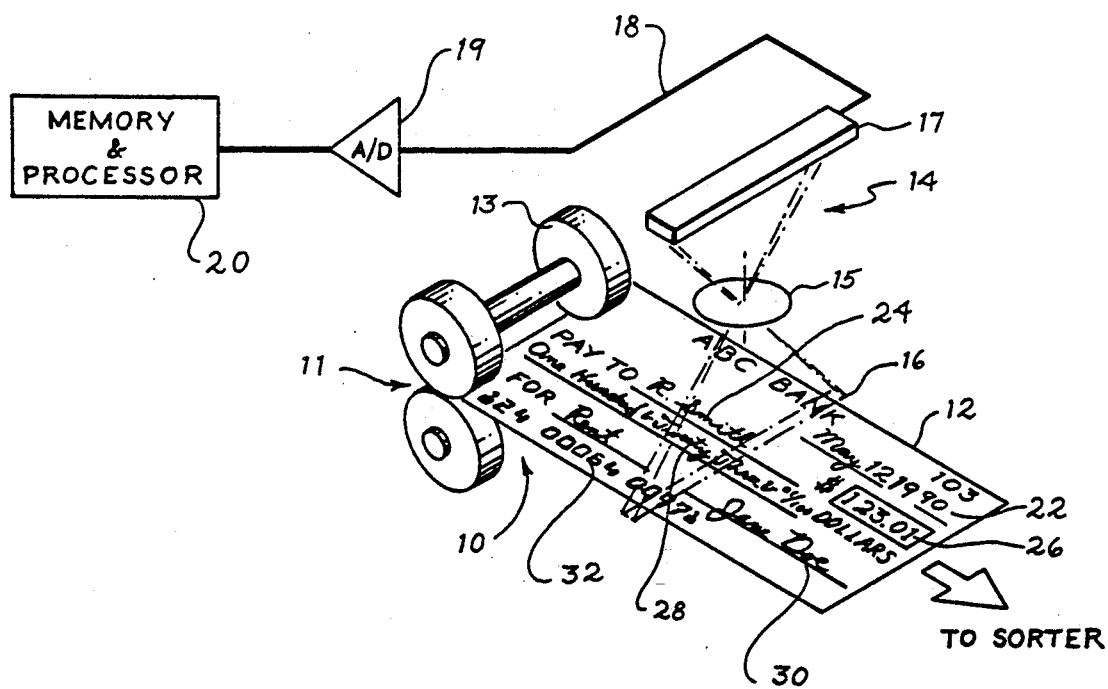
FIG. 1 illustrates the environment of the present invention, an image document processing system.

FIG. 1 illustrates an image capture system 10 within a document image processing system 11, such as IBM's Model 3890 Image Plus High Performance Transaction System. Such a system typically uses a transport 13 to move a document 12 one at a time from an input hopper (not shown) sequentially past a plurality of other processing stations and finally into one of several output hoppers or pockets, based usually upon the information content read from the document under program control as it passes. This transport moves the document at a high speed (over 300 inches per second in a Model 3890) which allows the system to process 2400 documents per minute).

An optical system 14 including a focusing lens 15 uses an extended array 17 to capture an electrical representation of each line 16 of the document, based on either the black/white or gray characteristics of the document. While the resolution of the system depends on the design and components, one example divides each inch into 240 picture elements (pels or pixels) in each of the horizontal and vertical directions.

The array 17 is commercially available from various manufacturers, such as Reticon, and may be a charge coupled device in which the impinging light on each sensor develops an electrical signal proportional to the amount of light. The electrical signals pass on line 18 to an analog-to-digital converter 19, which together with thresholding, converts each pel into a digital representation, which is then stored in memory 20 for storage and/or further processing as desired. For further details of an image capture and processing system, see U.S. Pat. No. 4,888,812 to Dinan et al., which is specifically incorporated herein by reference.

The document 12 includes a variety of indicia, some of which may be printed and some may be handwritten. Other documents may include typewritten or characters or those printed by machine. This indicia includes a date field 22, a payee line 24, an amount field 26 (sometimes referred to as a "courtesy amount field" which comprises numerals rather than words in most cases). a field 28 including the amount in words, a signature 30 and a MICR codeline 32.

Referring to FIG. 2, a check 40 is illustrated in one of many formats which might occur. As shown, the check 40 includes a personalized account holder name and address 42, a date block 44 including the word "date" 46 and a printed indicia of the date itself 48, a section introducing the payee 50, a payee name 52, an account block 54 including the word "account number" 56 and an account number 58 and an amount block 60 including the word "amount" 62 and an amount field 64. Also included are a signature 66 and a representation of a MICR line 68.

While this invention is being illustrated in the context of a check, it is by no means limited to a check. Other financial documents such as deposit slips, records of charge, tickets for travel, and similar could be used, and other types of fields having predefined characteristics could be located to advantage like the amount field being described.

FIG. 3 shows the results of counting the number of black pels in the image of FIG. 2. In this case, both the vertical and horizontal regions of the check are divided for image processing purposes into imaginary sections which are 1/240 inch square, and each region, also referred to as pixels or pels, is determined to be either black or white using a thresholding algorithm (not part of the present invention but generally well known in the art of image capture and processing).

An optional search area reduction can be used in those instances where the form of the check or other financial document can be identified as a previously stored format.

For example, some indicia on the document may indicate that only the right half of the document needs to be searched for the amount field.

After this thresholding, and optional image reduction the number of black pels on each horizontal line are counted and that count associated with each line is stored. Referring back to FIG. 2, lines numbered 101–120 have been labeled at the left side of the check 40 to represent some of the horizontal scan lines in the image. For each line identified, a number of black pels has been stored in a table represented by FIG. 3, allowing bands of regions of horizontal lines to be identified which contain a significant number of black pels, more than mere noise or stray marks could cause to be black. The rest of the image then is discarded. As shown in this FIG. 3, the threshold may be more than 10 black pels in a line and require a minimum of X consecutive lines be identified in order to call this a band significant region of horizontal lines containing a likely field.

FIG. 4 illustrates one such horizontal band as selected in connection with FIG. 3. In practice, each such band would be separately processed, but for the purpose of this description, only one will be shown and described. The solid box assumes that the optional scan reduction described in connection with FIG. 3 was used, while the dotted additional section (as an extension of the solid box) shows the processing without the optional scan reduction.

FIG. 5 illustrates rectangular windows from the horizontal band of FIG. 4. These windows are chosen by summing the vertical columns of pels and discarding those vertical regions with fewer than a preset number of black pels, similar to the thresholding of FIG. 3 in the horizontal direction.

FIG. 6 illustrates the character strings which have been segmented according to one of several well known segmentation systems. Horizontal lines, which may be used to form part of printed boxes have been discarded, but the vertical line portions of boxes are retained.

FIG. 7 illustrates the character strings of FIG. 6 converted into classified strings. Each symbol in the character string is identified as either a decimal point (.). a vertical bar ( ) (which may be a remnant of a printed box, either the right or left portion thereof). machine print characters (which includes a dollar sign as printed on many blank checks, excludes vertical bars) and hand-print characters (which might be any single character not previously categorized). The classified string then includes one symbol for each element of the character string.

FIG. 8 illustrates the selected amount field based on character strings in FIG. 7. Since an amount field includes exactly two digits following a decimal point and before a vertical bar indicating the terminal or right end of a box, a classified string ending with ".MM  " or ".HH  " meets the criteria. Also, since a leading dollar sign is frequently a machine print character and outside the left side of the box, a string which starts "M  " is also a candidate to be an amount field. The present system also recognizes a classified string having any of the following formats or signatures as an amount field: "M  H X H  "; "  MM  "; and ".MM" (where "X" is any number of handprint characters).

Of course, many modifications to the present invention are possible without departing from its spirit. Furthermore, some of the features of the present invention can be used to advantage without the corresponding use of other feature. Accordingly, the present description should be considered as merely illustrative of the concepts and the principals of the present invention and not an imitation thereof.

Having thus described the invention, what is claimed is:

1. A method for locating an amount field on a document comprising the steps of:
    creating a black and white image of the entire document and counting the number of black pels in each horizontal line of that document;
    locating horizontal segments on the document which include more black pels in each line that contain more than a preset threshold number of black pels;
    counting the black pels in vertical sections of each located horizontal segment of the document including more than a threshold number of black pels, whereby rectangular areas including a substantial number of black pels are identified;
    creating a signature for each such rectangular area wherein each character is determined to be one type of character selected from the list of hand print character, machine print character, vertical bar and decimal point prior to identifying each character;
    using the signature of each block to identify a block which is likely to be an amount field; and
    using only the block identified as likely to be the amount field for a further recognition step on the block identified as the amount field.

2. The method of claim 1 wherein the signature for an amount field is identified by finding in consecutive order a decimal point, a machine readable character, a second machine readable character, and a vertical bar.

3. A method of identifying an amount field on a document including the steps of claim 1, wherein the signature which is recognized includes a decimal point, two hand print characters, and a vertical bar.

4. A method of identifying an amount field on a document including the steps of claim 1 wherein the step of creating a signature includes the step of discarding horizontal lines defining a box but including and classifying a vertical line as a separate symbol within the signature.

5. A method of identifying an amount field on a document including the steps of claim 1 further including the step of discarding horizontal lines which form part of a box.

6. A method of identifying an amount field on a document including the steps of claim 1 and further including the step of reducing the scan area for black pels based upon stored document format information.

* * * * *